US006954043B2

(12) United States Patent
Ohshima

(10) Patent No.: US 6,954,043 B2
(45) Date of Patent: Oct. 11, 2005

(54) POWER WINDOW DRIVING APPARATUS

(75) Inventor: Shunzou Ohshima, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/953,444

(22) Filed: Sep. 30, 2004

(65) Prior Publication Data

US 2005/0104546 A1 May 19, 2005

(30) Foreign Application Priority Data

Sep. 30, 2003 (JP) ....................................... P.2003-341803

(51) Int. Cl.$^7$ ............................................... H02P 1/00
(52) U.S. Cl. ........................ 318/265; 318/445; 318/466; 318/468
(58) Field of Search ................................. 318/265, 445, 318/443, 450, 453, 455, 465, 466, 468, 469, 479

(56) References Cited

U.S. PATENT DOCUMENTS

2002/0043948 A1 * 4/2002 Ogasawara ................. 318/445
2002/0158596 A1 * 10/2002 Pehrson et al. ............. 318/445

FOREIGN PATENT DOCUMENTS

| JP | 10-25964 A | 1/1998 |
| JP | 2001-20605 A | 1/2001 |
| JP | 2002-96632 A | 4/2002 |
| JP | 2002-295129 A | 10/2002 |

* cited by examiner

*Primary Examiner*—Karen Masih
(74) *Attorney, Agent, or Firm*—Sughrue Mion, PLLC

(57) ABSTRACT

A power window driving apparatus includes a reference current generator which generates a reference current corresponding to a motor current. The power window driving apparatus further includes a comparator which compares the reference voltage with a comparison signal; a stopping or reversing circuit which stops or reverses the driving motor based on a comparison result by the comparator; a first timer and a second timer which measure two predetermined times from the start of activation of the driving motor; a voltage difference holder which hold a difference between the comparison signal and the reference voltage so as to be equal to or greater than a first predetermined value while the first timer is in operation; and a voltage difference reducer which reduces monotonously the difference until the difference becomes a second predetermined value while the second timer is in operation after the first timer is completed the measuring of time.

6 Claims, 3 Drawing Sheets

POWER WINDOW DRIVING APPARATUS

BACKGROUND OF THE INVENTION

The present invention relates to a power window driving apparatus for driving and controlling a power window installed in a vehicle, and more particularly to a technique for detecting with high accuracy a seizure of an obstacle when the obstacle seizure occurs at an initial stage of the driving of the power window.

A power window glass is connected to a driving motor and is operated to be raised or lowered by rotating reversibly the driving motor through operation of a switch. In addition, there has been proposed and put into practical use a power window having a function to prevent a damage to an obstacle and/or a power window glass that would be caused in the event that the obstacle is seized by the power window while it is being raised by stopping and then reversing the driving motor so as to lower the power window glass.

In the power window having the obstacle seizure preventing function, in the event that an obstacle seizure by the power window occurs immediately after the driving motor has been activated, it is not possible to detect the obstacle seizure momentarily, resulting in a case where an excessive load is applied to the obstacle.

Namely, when the driving motor is activated, a rush current flows, and the obstacle seizure detecting function does not work until the rush current disappears. In addition, when the window glass is operated to be raised after it has been lowered and stopped once, there is generated a state where no load is applied to the driving motor immediately after the raising operation has been implemented, and there exists a time period when the motor current becomes extremely small. Then, this time period has elapsed, a load is then applied to the driving motor, and the current flowing to the driving motor is increased drastically.

In the related power window driving apparatus, the drastic increase in the current is detected, and this results in an erroneous reversal of the driving motor in which the driving motor is erroneously stopped or reversed (see JP-A-2001-20605, for example).

As described above, in the related power window driving apparatus, in the event that the obstacle is seized by the window glass, since the seizure is detected and the window is then stopped or reversed, trouble in association with the obstacle seizure can be avoided, however, there still occurs a case where trouble takes place that the motor is erroneously stopped or reversed when the current develops again after the current has decreased after the motor was driven, and there has been developed a demand to prevent the occurrence of the trouble by some means or other.

SUMMARY OF THE INVENTION

It is therefore an object of the present invention to provide a power window driving apparatus which can prevent the occurrence of erroneous stopping of a driving motor immediately after the driving motor has been activated and which can ensure the detection of a seizure of an obstacle by a widow glass in the event that such a seizure actually happens.

With a view to attaining the object, according to a first aspect of the invention, there is provided a power window driving apparatus for controlling the driving of a power window, comprising:

a reference current generator, which generates a reference current (Ir) corresponding to a motor current (ID) in a level, the motor current flowing to a driving motor, the reference current generator including:

a first current generator, which generates a first current (Ir1) corresponding to a variation value of the motor current (ID) in a level; and a second current generator, which generates a second current (Ir3) which is derived from a reference voltage (Vc), the second current being equal to the reference current (Ir) when added to the first current (Ir1), and the reference voltage (Vc) generated from a time mean value of a first voltage (Vc2) which is converted from the first current;

a comparator (CMP1), which compares the reference voltage (Vc) with a comparison signal (Vins) which is greater than the first voltage;

a stopping or reversing circuit, which stops or reverses the driving motor when it is determined that a drastic current increase is occurred in the motor current based on a comparison result by the comparator;

a first timer (TM1), which measures a first predetermined time from the start of activation of the driving motor;

a second timer (TM2), which measures a second predetermined time from the start of activation of the driving motor;

a voltage difference holder, which hold a difference between the comparison signal and the reference voltage so as to be equal to or greater than a first predetermined value while the first timer is in operation, in a state that the comparison signal (Vins) is greater than the reference voltage signal (Vc); and a voltage difference reducer, which reduces monotonously the difference between the comparison signal and the reference voltage until the difference becomes a second predetermined value (Vclmp) while the second timer is in operation after the first timer completes the measuring of time.

According to a second embodiment, there is provided a power window driving apparatus as set forth in the first aspect of the invention, wherein the measuring time of the first timer is set longer than a time interval that is required for the driving motor to be driven over a peak of the rush current and to reach to a down slope of the rush current.

According to a third aspect of the invention, there is provided a power window driving apparatus as set forth in the second aspect of the invention, wherein the voltage difference holder includes a first circuit having a first resistance (R42) and a first semi-conductor element (T41) which are connected in series; and wherein the first semiconductor element is energized while the first timer is in operation.

According to a fourth aspect of the invention, there is provided a power window driving apparatus as set forth in the second aspect of the invention, wherein the voltage difference reducer includes a second circuit having a second semiconductor element (T240) and a second resistance (R240) which are connected in series, and the second circuit being provided between a power supply and the circuit; and wherein a comparison signal or a voltage resulting when a predetermined voltage is added to or subtracted from the comparison signal is applied to a control terminal of the second semi-conductor element.

According to a fifth aspect of the invention, there is provided a power window driving apparatus as set forth in the fourth aspect of the invention, wherein the second semi-conductor element (T240) is configured by a NMOS transistor or a NPN transistor, wherein a voltage between a gate and a source of the second semiconductor element or a voltage between a base and an emitter of the second semi-conductor element is fallen within the second predetermined value (Vclmp); and wherein a gradient of the difference between the comparison signal and the reference voltage while the first timer is not in operation and the second timer is in operation is set based on a time constant defined by a capacitor (C1) and the resistance (R240).

According to a sixth aspect of the invention, there is provided a power window driving apparatus as set forth in the fifth aspect of the invention, wherein the first circuit and the second circuit operates simultaneously while the first timer is in operation.

With the power window driving apparatus according to the invention, since the comparison signal Vins is set so as to become larger by the first predetermined value or more than the reference voltage signal Vc when the first time is in operation, the erroneous operation can be prevented which would otherwise be caused by the rush current when the driving motor is activated.

In addition, since the comparison signal Vins is set so as to be larger by the second predetermined value or more than the reference voltage Vc when the second timer is in operation after the first timer has completed the measuring of time, the occurrence of trouble can be avoided that the driving motor is stopped or reversed by the increase in current that occurs immediately after the driving motor has been activated. In addition, in the event that an obstacle is seized by the window glass during this time period, since the obstacle seizure can be detected in an ensured fashion so as to stop or reverse the driving motor, damage to the obstacle and the window glass itself can be prevented which would otherwise be caused by the seizure of the obstacle by the window glass.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
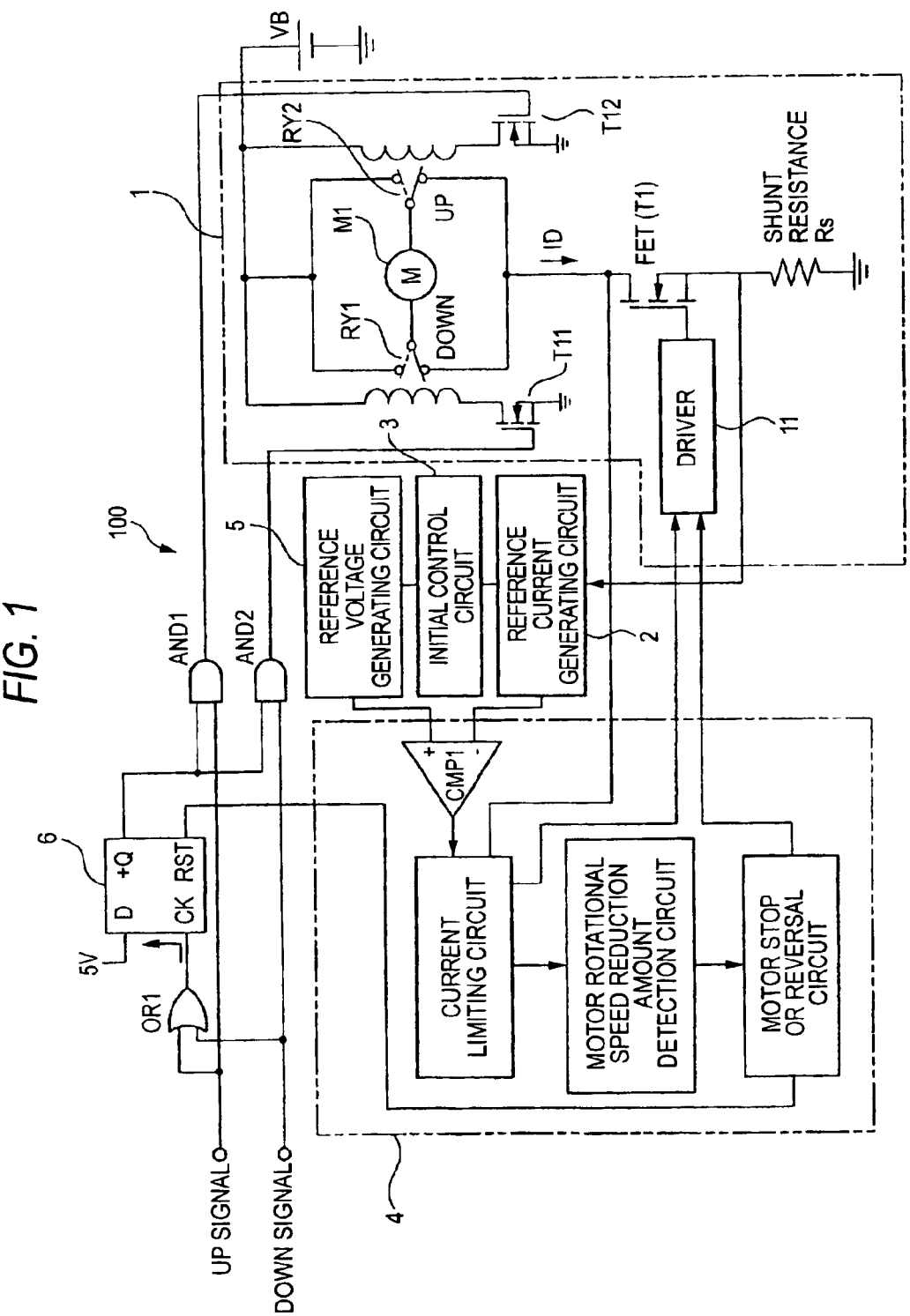
FIG. 1 is a block diagram showing the configuration of a power window driving apparatus according to an embodiment of the invention.
Figure 2:
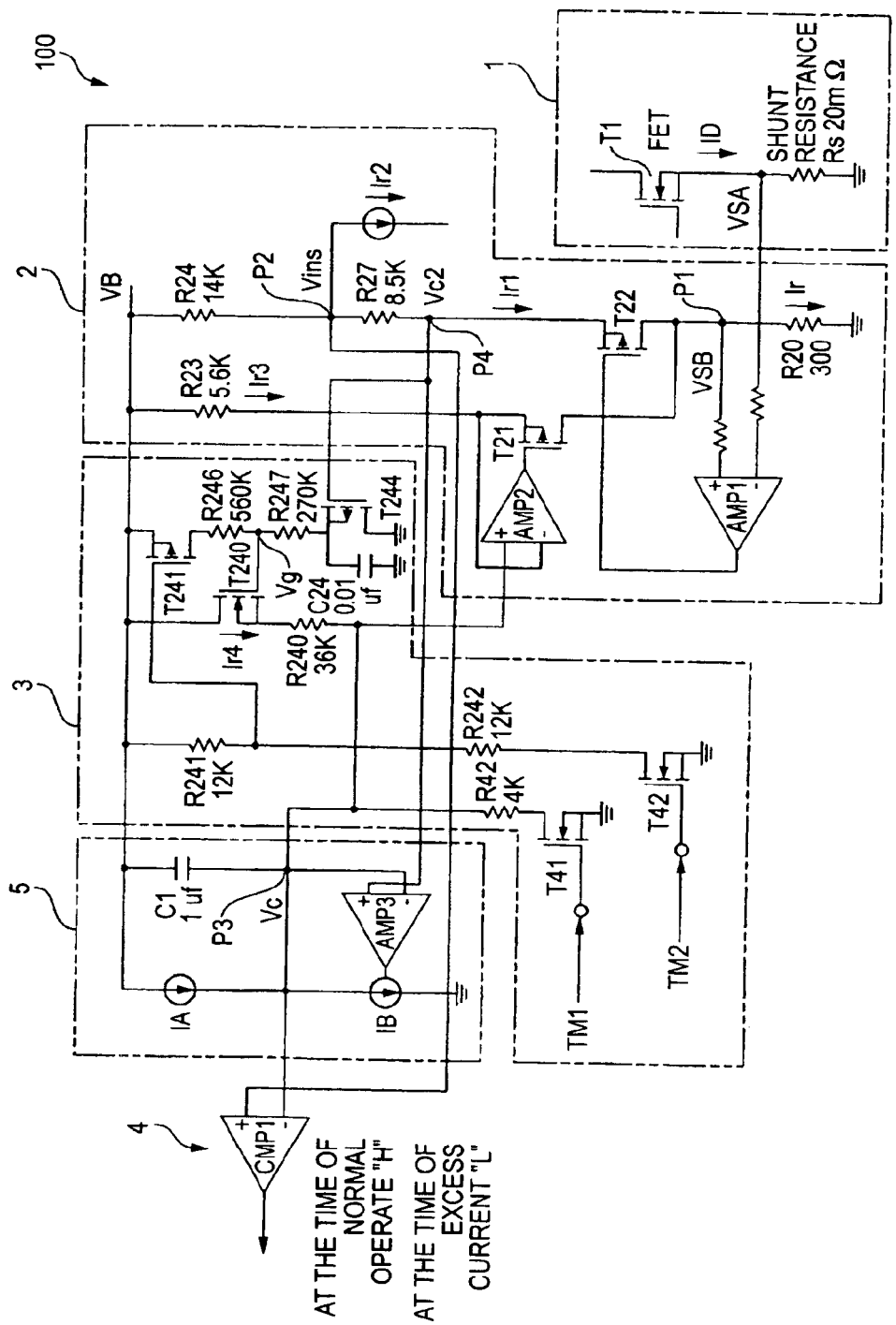
FIG. 2 is a circuit diagram showing a specific configuration of the power window driving apparatus shown in FIG. 1.

Hereinafter, an embodiment of the invention will be described based on the drawings. FIG. 1 is a block diagram showing the configuration of a power window driving apparatus according to an embodiment of the invention, and FIG. 2 is a circuit diagram (part of which is omitted) showing a specific configuration of the power window driving apparatus. As shown in FIG. 1, the power window driving apparatus 100 includes a driving circuit 1 for driving to rotate reversibly a driving motor M1 for driving a window glass, a reference current generating circuit 2, an initial control circuit 3, a reference voltage generating circuit 5 and a comparing circuit 4.

Furthermore, the power window driving apparatus 100 includes an OR circuit OR1, a flip-flop circuit 6 and two AND circuits AND1, AND2. In addition, output terminals of the AND circuits AND1, AND2 are connected to an FET (T11) and an FET (T12), respectively. When an output signal of the AND circuit AND1 results in an "H" level, the FET (T12) becomes on, whereas when an output signal of the AND circuit AND2 results in the "H" level, the FET (T11) is on.

The driving motor M1 is connected to a battery power supply VB and an FET (T1) via two relay contacts RY1, RY2, and furthermore, the FET (T1) is connected to a ground via a shunt resistance Rs.

Then, when an Up signal is input in order to raise the window glass, the FET (T12) becomes on, and the relay contact RY2 is on, whereby a forward current flows to the driving motor M1 and the driving motor M1 rotates in the forward direction, the window glass being thereby raised.

On the contrary, when a Down signal is input in order to lower the window glass, the FET (T11) becomes on, and the relay contact RY1 is on, whereby a reverse current flows to the driving motor M1 and the driving motor M1 rotates in the reverse direction, the window glass being thereby lowered.

In addition, the driving circuit 1 includes a driver 11, and the FET (T1) is controlled to be on and off by the driver 11.

As shown in FIG. 2, the reference current generating circuit 2 has two amplifiers AMP1, AMP2 and two FETs (T21), (T22). A negative side input terminal of the amplifier AMP1 is connected to a connecting point (a voltage of this point is regarded as VSA) between the FET (T1) and the shunt resistance Rs via a resistance, and a positive side terminal thereof is connected to a point P1 (a voltage of this point is regarded as VSB) via a resistance.

The point P1 is connected to a ground via a resistance R20. Note that, in FIG. 2, "300" shown under the resistance R20 denotes that the resistance R20 is 300Ω, and this notation is applied to other elements.

Furthermore, the point P1 is connected to a drain of the FET (T22) and a drain of the FET (T21), and a gate of the FET (T22) is connected to an output terminal of the amplifier AMP1. In addition, a source (a point P4) of the FET (T22) is connected to the battery power supply VB via a resistance 27 and a resistance R24.

In addition, a connecting point P2 of the resistance 24 and the resistance 27 is connected to a positive side input terminal of a comparator CMP1. Note that the voltage of the point P2 is assumed as Vins (a comparison signal). Furthermore, the point P4 is connected to a positive side input terminal of an amplifier AM3, which will be described later on.

A gate of the FET (T21) is connected to an output terminal of the amplifier AMP2, and a source thereof is connected to the battery power supply VB via a resistance R23. A negative side input terminal of the amplifier AMP2 is connected to the source of the FET (T21). A positive side input terminal thereof is connected to the resistance R240 which is possessed by the initial control circuit 3, which will be described later on.

The initial control circuit 3 includes a first timer TM1 adapted to be in an on-state for a predetermined period of time (for example, 50 msec) after the driving motor M1 is activated and then to be off after the elapse of the predetermined time period, a second timer adapted to be in an on-state for a predetermined period of time (for example, 200 msec) similarly and then to be off after the elapse of the predetermined time period and FETs (T41), (T42), (T241), (T240).

An output terminal of the second timer TM2 is connected to a gate of the FET (T42), and a source of the FET (T42)

is grounded, a drain thereof being connected to the battery power supply VB via resistances R242, R241. In addition, a connecting point between the resistances R242 and R241 is connected to a gate of the FET (T241), and source of the FET (T241) is connected to the battery power supply VB.

Furthermore, a drain of the FET (T241) is connected to a source of an FET (T244) via resistances R246, R247, and a drain of the FET (T244) is grounded, a gate thereof being connected to the point P4. In addition, a connecting point between the resistance R247 and the FET (T244) is grounded via a capacitor C24.

Furthermore, a connecting point between the resistances R246 and R247 is connected to a gate (a voltage at this point is regarded as Vg) of the FET (T240; a second semi-conductor element), and a drain of the FET (T240) is connected to the battery power supply VB, a source thereof being connected to the positive side input terminal of the amplifier AMP2 via the resistance R240 (a second resistance) and also being connected to a point P3 of the reference voltage generating circuit 5. Here, a second circuit is constituted by the FET (T240) and the resistance R240.

An output terminal of the first timer TM1 is connected to a gate of the FET (T41; a first semi-conductor element), and a source of the FET (T41) is grounded, a drain thereof being connected to the point P3 via a resistance R42 (a first resistance) Here, a first circuit is constituted by the FET (T41) and the resistance R42.

The reference voltage generating circuit 5 includes current sources IA, IB, an amplifier AMP3 and a capacitor C1. A positive side input terminal of the amplifier AMP3 is connected to the point P4, whereby a voltage Vc2 at the point P4 is applied thereto. In addition, a negative side input terminal (the point P3) of the amplifier AMP3 is connected to the supply voltage VB via the capacitor C1 and the point P3 is connected to a negative side input terminal of the comparator CMP1 of the comparing circuit 4.

Current values of the current sources IA, IB are configured so as to satisfy a relationship of IB=2*IA, and the current sources IA, IB are connected in series between the battery power supply VB and the ground, a connecting point of the current sources being the point P3. In addition, the current source IB allows a current to flow when the output terminal of the amplifier AMP3 results in an "L" level and stops the current when the output terminal results in the "H" level.

As this occurs, if the voltage Vc2>Vc, an output signal of the amplifier AMP3 results in the H level, and the constant current source IB is cut off, whereby a current IA flows into a negative side input terminal of the capacitor C1, and the voltage Vc (the reference voltage signal) increases. In addition, if the voltage Vc2<Vc, the output signal of the amplifier AMP3 results in the L level, and a current IB flows, whereby a current of (IB−IA)=IA is induced from a negative side terminal of the capacitor C1, the voltage Vc decreasing.

In FIG. 2, a current limiting circuit, a motor rotational speed decreasing quantity detecting circuit, a motor stopping or reversing circuit and a driver which are provided on an output side of the comparator CMP1 shown in FIG. 1 are omitted.

Next, the operation of the power window driving apparatus according to the embodiment, which is configured as has been described heretofore, will be described below. A current flowing to the driving motor M1 varies as indicated by a curved line S1 shown in FIG. 3 when the power window is activated. Namely, a current value increases drastically immediately after the activation, thereafter decreases, and increases again (a portion indicated by X1 in the drawing) to result in a stable steady-state current In this embodiment, an erroneous operation that would occur due to the rush current generated within in the order of 50 msec after the activation and an erroneous operation that would occur due to a current variation generated in the order of 50 to 200 msec (a range indicated by X1 in the drawing) after the activation are prevented, and in the event that an obstacle is seized by the window glass, the seizure of the obstacle by the window glass is detected in an ensured fashion.

Firstly, the operation at the normal time will be described. When an up signal shown in FIG. 1 is input, the output signal of the AND circuit AND1 results in the "H" level, and the FET (T12) is on, whereby the relay contact RY2 is on, and the current flows through the battery power supply VB, the relay contact RY2, the driving motor M1, the relay contact RY1, the FET (T1) and the shunt resistance Rs sequentially in that order, so that the driving motor M1 is driven to drive the window glass in the rising direction.

As this occurs, a voltage proportional to a motor current ID of the driving motor M1 is generated across the shunt resistance Rs, and this voltage constitutes VSA. In addition, a reference current Ir which results by adding a current Ir1 (a first current) flowing to the FET (T22) to a current Ir3 (a second current) flowing to the FET (T21) is flowing to the resistance R20 of the reference current generating circuit 2, and a voltage proportional to the reference current Ir in magnitude is generated across the resistance R20, this voltage constitutes VSB.

Then, since an output signal of the amplifier AMP1 results in a magnitude which is proportional to a difference between the voltage VSA and the voltage VSB and this output signal is supplied to the gate of the FET (T22), the current Ir1 (the first current) is controlled such that the reference current Ir has a magnitude proportional to the motor current ID. Since the magnitude of the current Ir1 is reflected to the voltage Vins at the point P2, in the event that the motor current ID is in a normal value (in the event that there exists no drastic increase in current), the voltage Vins becomes larger than the reference voltage Vc that is generated at the point P3, and an output signal of the comparator CMP1 results in the "H" level, which indicates the normal state. Consequently, the stopping and reversing operations by the comparing circuit 4 are not implemented.

In addition, in the event that a drastic current increase occurs in the driving motor M1, since the reference current Ir increases in line with the drastic current increase and the quantity of voltage drop by the resistance R24 becomes larger, the voltage Vins at the point P2 decreases to be lower than the reference voltage Vc. Then, the output signal of the comparator CMP1 is reversed to result in the "L" level, whereby the FET (T1) is made to be off by the driver circuit 11. In addition, the comparing circuit 4 outputs a reset signal to the flip-flop circuit 6 and switches output signals to the AND circuits AND1, AND2 to the "L" level, whereby the driving motor M1 is stopped.

According to this configuration, in the event that an obstacle is seized by the window glass when it is being raised and an excess current flows to the driving motor, the driving motor can be stopped momentarily, thereby making it possible to prevent damage to the obstacle or the relevant window glass itself.

Next, the operation will be described which results immediately after the driving motor M1 is driven. Output signals of the first timer TM1 and the second timer TM2 which are shown in FIG. 2 both result in the "H" level immediately after the driving motor M1 has been driven.

In addition, since the driving motor M1 is temporarily put in a no-load state immediately after the driving motor has been activated (in particular, when the load is increased for the first time after the decreasing operation has been performed) and is loaded thereafter, a large current variation occurs. The power window driving apparatus according to this embodiment prevents the erroneous stopping of the driving motor attributed to the current variation and operates to ensure the detection of an obstacle seizure by the window glass in the event the seizure actually happens.

When the first timer TM1 is turned on, a signal of the "H" level is supplied to the gate of the FET (T41), whereby the FET (T41) is turned on.

When the second timer TM2 is turned on, an output signal of the second timer TM2 is supplied to the gate of the FET (T42), and the FET (T42) is turned on, whereby the FET (T241) is turned on, and the second circuit constituted by the FET (T240) and the resistance R240 is activated.

A voltage Vg that has derived from the voltage Vins at the point P2 is applied to the gate of the FET (T240). This voltage Vg is generated as below by a circuit constituted by the FET (T244), the resistances R246, R247 and the capacitor C24.

The resistances R246, R247 and the FET (T244) are connected in series, one of terminals of the resistance R246 is connected to the drain of the FET (T241), and a connecting point between the resistances R246 and R247 is connected to the gate of the FET (T240).

The drain of the FET (T244) is grounded, and the voltage Vc2 at the point P4 which is generated by the reference current generating means 2 is applied to the gate of the FET (T244).

When the FET (T241) is turned on (namely, when the timer M2 is turned on), the FET (T244) and the resistances (R246+R247) operate as a source follower. Assuming that the gate voltage of the FET (T240) is Vg, and a threshold voltage of the FET (T244) is Vth244, the following equation (1) is established.

$$Vg=Vc2+Vth244+(VB-Vth244-Vc2)\times R247/(R246+R247) \quad (1)$$

On the other hand, when expressing the comparison signal Vins using the voltages VB and Vc2, the following equation (2) is obtained.

$$Vins=Vc2+(VB-Vc2)*R27/(R24+R27) \quad (2)$$

Assuming that a potential difference between Vins and Vg is Vinsg, and when subtracting the both sides of the equation (1) from the both sides of the equation (2), the following equation (3) is obtained.

$$Vinsg=Vins-Vg=(VB-Vc2)*\{R27/(R24+R27)-R247/(R246+R247)\}-Vth244*\{1-R247/(R246+R247)\} \quad (3)$$

Assuming that a threshold voltage of the FET (T240) is Vth240 and a potential difference between the comparison signal Vins and the source of the FET (T240) is Vclmp, the following equation (4) is obtained.

$$Vclmp=Vinsg+Vth240=(VB-Vc2)*\{R27/(R24+R27)-R247/(R246+R247)\}-Vth244*\{1-R247/(R246+R247)\}+Vt240 \quad (4)$$

Here, when selecting threshold voltages for the FET (T240), the FET (T244) so as to realize Vth240=Vth244, the following equation (5) is obtained.

$$Vclmp=(VB-Vc2)*\{R27/(R24+R27)-R247/(R246+R247)\}+Vth240*R247/(R246+R247) \quad (5)$$

In the example shown in FIG. 2, since settings are implemented to satisfy the following relationship; R24=14KΩ, R27=8.5KΩ, R246=560KΩ, R247=270KΩ, and Vth240=0.85V, the following equation (6) is obtained.

$$Vclmp=0.052*(VG-Vc2)+0.276(V) \quad (6)$$

Here, the capacitor C24 is interposed between the source of the FET (T244) and the ground. Since the capacitor C24 is discharged through the FET (T244), the discharging resistance is very small. On the other hand, since the capacitor C24 charges through the resistance (R246+R247) whose resistance value is large, the time constant thereof become large.

Since R246=560KΩ, R247=270KΩ, and C24=0.01 μF in the circuit shown in FIG. 2, the charging time constant becomes 8.3 msec. Consequently, when Vc2 is caused to vary by a pulsating component, the source of the FET (T244) is held to a voltage level corresponding to a minimum value thereof.

Since the voltage Vins also pulsates in synchronism with the voltage Vc2, Vc is understood to be clamped relative to the minimum value of the voltage Vins. Since a threshold voltage (this is regarded as Vjth) for detection of an obstacle seizure is a potential difference between the minimum value of the voltage Vins and the voltage Vc, a clamping voltage corresponding to the threshold voltage Vjth is realized.

Next, the operation of the driving motor M1 immediately after it has been activated will be described based upon the above description. When the driving motor M1 is activated, the first timer TM1 and the second timer TM2 both start Both the FET (T41) and the FET (T 42) are turned on when an output signal of the first timer TM1 results in the "H" level, and the first circuit (a circuit made up of T41 and R42) and the second circuit (a circuit made up of T240 and R240) are activated simultaneously. As a result, a current Ir4 flows to the resistances R240 and R42, and the voltage Vc at the point P3 is held to a voltage resulting by dividing (Vins-Vclmp) by the resistances R240 and R42, that is, (Vins-Vclmp)*R42/(R42+R240). The comparison signal Vins at this time is larger than the reference voltage signal Vc, and a difference between the comparison signal Vins and the reference voltage signal Vc can be expressed by the following equation (7).

$$Vins-Vc=(Vins-Vclmp)*R240/(R240+R42)+Vclmp \quad (7)$$

As a result, a voltage difference equal to or larger than a certain value is secured between the two voltages. The voltage "Vins−Vc" expressed by the equation (7) is a first predetermined value.

Consequently, the first predetermined value (the voltage expressed by the equation (7)) can prevent the reference voltage Vc from exceeding the voltage Vins for a time period (for example, 50 msec) when the first timer TM1 is in on-state, whereby the trouble can be avoided that the rotational motion of the driving motor M1 is stopped by a rush current resulting when the driving motor M1 is started to be driven.

Thereafter, when the first timer TM1 becomes off (when 50 msec has elapsed), the FET (T41) is turned off, and since the current Ir4 becomes such as to only charge the capacitor C1, the current Ir4 decreases drastically, the potential difference between the voltage Vins and the voltage Vc decreases monotonously. A decreasing gradient at which the potential difference decreases is defined by the magnitude of "C1*R240".

When the current Ir4 becomes zero after the charging of the capacitor C1 has been completed, the potential difference between the voltage Vins and the voltage Vc converges on Vclmp. Vclmp is a second predetermined value.

Figure 3:
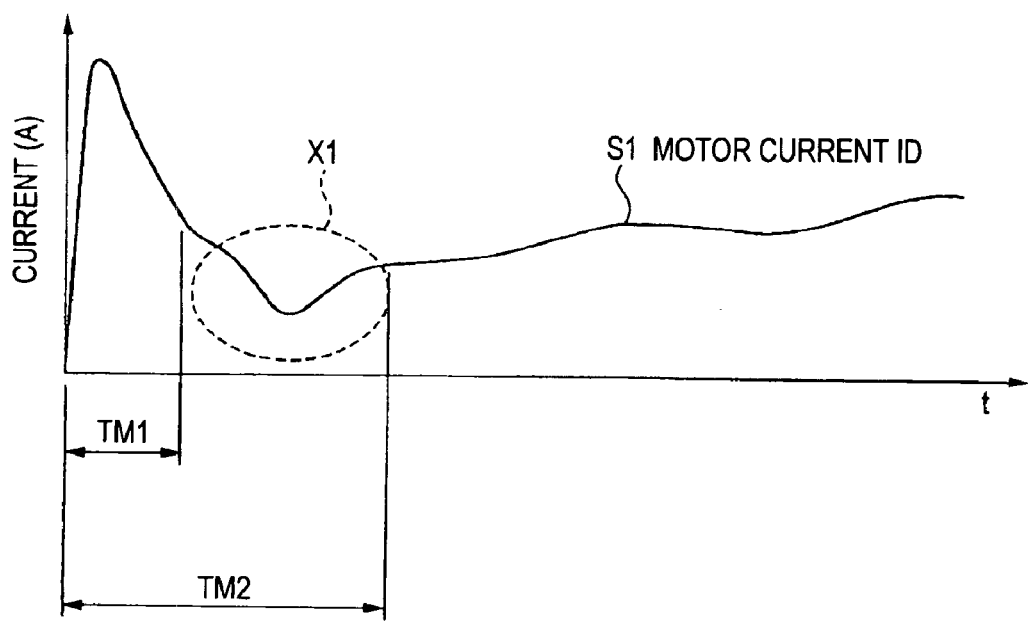
FIG. 3 is a characteristic diagram showing a variation in current when a driving motor is driven.

Consequently, since the voltage Vclmp is generated between the voltage Vins and the voltage Vc in the area indicated by reference character X1 in FIG. 3, when the current increases (a current increase in the area X1) during the normal operation, the output of the comparator CMP1 does not reverse but is maintained at the "H" level. In addition, when the motor current ID flowing to the driving motor M1 increases by an obstacle seizure by the window glass, whereby the voltage Vins lowers below the reference voltage Vc, the output signal of the comparator CMP1 reverses to result in the "L" level, and therefore, the FET (T1) is made to be off by controlling the driver 11 shown in FIG. 1, so that the driving motor M1 is stopped. However, while the erroneous reversal preventing effect is enhanced when the second predetermined value Vclmp is set to be large, a reversing load resulting when an obstacle seizure by the window glass occurs increases. On the contrary, when the second predetermined value is set to be small, while the reversing load decreases, the erroneous reversal preventing effect for the current variation indicated by reference character X1 in FIG. 3 also decreases. Therefore, TM1, TM2 and the time constant C1*R240 need to be set in consideration of the fact.

Thus, it is possible to prevent the erroneous stopping of the driving motor M1 due to the current which decreases once after the driving motor M1 is activated and then rises again, and in the event that there occurs an obstacle seizure by the window glass during this time period, the obstacle seizure can be detected in an ensured fashion, so that the driving motor M1 can be stopped.

In the power window driving apparatus 100 according to the embodiment, since the potential difference set by the first predetermined value continues to be generated between the voltage Vins and the voltage Vc until the time has elapsed (for example, 50 msec) which is measured by the first timer TM1 after the driving motor M1 has been driven when the motor is started to be driven, the trouble can be avoided that the driving motor M1 is stopped by the rush current generated when the driving motor M1 is driven.

In addition, since the potential difference set by the second predetermined value (Vclmp) continues to be generated between the voltage Vins and the voltage Vc while the measuring of time by the second timer TM2 continues after the measuring of time by the first timer TM1 has been completed (for example, for the time period of 50 to 200 msec after the start of driving of the driving motor M1), in the event that a current rise (the current rise indicated by reference character X1 in FIG. 3) that is generated at an initial stage of driving is generated, the trouble can be avoided that the driving motor M1 is erroneously stopped, and in the event that an obstacle seizure by the window glass occurs, such an obstacle seizure can be detected in an ensured fashion, so that the driving motor M1 can be stopped.

Thus, while the power window driving apparatus of the invention has been described based on the embodiment illustrated in the drawings, the invention is not limited thereto, and the configurations of the respective circuits can be replaced with any configurations having similar functions. For example, while, in the embodiment, the example is taken where the time measuring time by the first timer TM1 is set to 50 msec and the time measuring time by the second timer TM2 is set to 200 msec, the invention is not limited thereto, and the measuring times can be set to appropriate times depending upon the characteristics of the driving motor M1.

The power window driving apparatus according to the invention is extremely useful in preventing an obstacle seizure by the power window.

What is claimed is:

1. A power window driving apparatus for controlling the driving of a power window, comprising:
   a reference current generator, which generates a reference current (Ir) corresponding to a motor current in a level, the motor current flowing to a driving motor, the reference current generator including:
      a first current generator, which generates a first current corresponding to a variation value of the motor current in a level; and
      a second current generator, which generates a second current which is derived from a reference voltage, the second current being equal to the reference current when added to the first current, and the reference voltage generated from a time mean value of a first voltage which is converted from the first current;
   a comparator, which compares the reference voltage with a comparison signal which is greater than the first voltage;
   a stopping or reversing circuit, which stops or reverses the driving motor when it is determined that a drastic current increase is occurred in the motor current based on a comparison result by the comparator;
   a first timer, which measures a first predetermined time from the start of activation of the driving motor;
   a second timer, which measures a second predetermined time from the start of activation of the driving motor;
   a voltage difference holder, which hold a difference between the comparison signal and the reference voltage so as to be equal to or greater than a first predetermined value while the first timer is in operation, and in a state that the comparison signal is greater than the reference voltage signal; and
   a voltage difference reducer, which reduces monotonously the difference between the comparison signal and the reference voltage until the difference becomes a second predetermined value while the second timer is in operation after the first timer completes the measuring of time.

2. The power window driving apparatus as set forth in claim 1, wherein the measuring time of the first timer is set longer than a time interval that is required for the driving motor to be driven over a peak of the rush current and to reach to a down slope of the rush current.

3. The power window driving apparatus as set forth in claim 2, wherein the voltage difference holder includes a first circuit having a first resistance and a first semi-conductor element which are connected in series; and
   wherein the first semi-conductor element is energized while the first timer is in operation.

4. The power window driving apparatus as set forth in claim 3, wherein the voltage difference reducer includes a second circuit having a second semi-conductor element and a second resistance which are connected in series, and the second circuit being provided between a power supply and the circuit; and wherein a comparison signal or a voltage resulting when a predetermined voltage is added to or subtracted from the comparison signal is applied to a control terminal of the second semi-conductor element.

5. The power window driving apparatus as set forth in claim 4, wherein the second semi-conductor element is configured by a NMOS transistor or a NPN transistor;

wherein a voltage between a gate and a source of the second semi-conductor element or a voltage between a base and an emitter of the second semi-conductor element is fallen within the second predetermined value; and wherein a gradient of the difference between the comparison signal and the reference voltage while the first timer is not in operation and the second timer is in operation is set based on a time constant defined by a capacitor and the resistance.

6. The power window driving apparatus as set forth in claim 4, wherein the first circuit and the second circuit operates simultaneously while the first timer is in operation.

* * * * *